(12) United States Patent
Frey et al.

(10) Patent No.: US 8,881,051 B2
(45) Date of Patent: Nov. 4, 2014

(54) ZOOM-BASED GESTURE USER INTERFACE

(75) Inventors: Martin Frey, Munich (DE); Marcus Hauer, Munich (DE); Dario Buzzini, New York, NY (US); Philipp Schaefer, Munich (DE); Adi Berenson, Tel Aviv (IL); Micha Galor, Tel Aviv (IL); Nili Metuki, Even Yehuda (IL); Alexander Shpunt, Tel Aviv (IL)

(73) Assignee: Primesense Ltd, Tel Aviv (IL)

( * ) Notice: Subject to any disclaimer, the term of this patent is extended or adjusted under 35 U.S.C. 154(b) by 104 days.

(21) Appl. No.: 13/541,786

(22) Filed: Jul. 5, 2012

(65) Prior Publication Data

US 2013/0014052 A1    Jan. 10, 2013

Related U.S. Application Data

(60) Provisional application No. 61/504,339, filed on Jul. 5, 2011, provisional application No. 61/521,448, filed on Aug. 9, 2011, provisional application No. 61/523,349, filed on Aug. 14, 2011.

(51) Int. Cl.
*G06F 3/048* (2013.01)
*G06F 3/033* (2013.01)
*G06F 3/0482* (2013.01)
*G06F 3/01* (2006.01)

(52) U.S. Cl.
CPC ...... *G06F 3/013* (2013.01); *G06F 2203/04806* (2013.01); *G06F 3/0482* (2013.01); *G06F 3/017* (2013.01)
USPC ............ 715/800; 715/848; 715/863; 715/716

(58) Field of Classification Search
CPC ................. G06F 3/017; G06F 3/0482; G06F 2203/04806; G06F 3/013
USPC ................... 715/800, 716; 356/610; 382/154
See application file for complete search history.

(56) References Cited

U.S. PATENT DOCUMENTS 4,550,250 A   10/1985  Mueller et al.
4,789,921 A   12/1988  Aho (Continued)

FOREIGN PATENT DOCUMENTS

WO    9935633 A2      7/1999
WO    2003071410 A2   8/2003

(Continued)

OTHER PUBLICATIONS

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.

(Continued)

*Primary Examiner* — David Phantana Angkool
(74) *Attorney, Agent, or Firm* — D. Kliger I.P. Services Ltd.

(57) ABSTRACT

A user interface method, including presenting by a computer executing a user interface, multiple interactive items on a display. A first sequence of images is captured indicating a position in space of a hand of a user in proximity to the display, and responsively to the position, one of the interactive items is associated with the hand. After associating the item, a second sequence of images is captured indicating a movement of the hand, and responsively to the movement, a size of the one of the items is changed on the display.

38 Claims, 9 Drawing Sheets

(56) References Cited

U.S. PATENT DOCUMENTS

| | | |
|---|---|---|
| 4,988,981 A | 1/1991 | Zimmerman et al. |
| 5,264,836 A | 11/1993 | Rubin |
| 5,495,576 A | 2/1996 | Ritchey |
| 5,588,139 A | 12/1996 | Lanier et al. |
| 5,594,469 A | 1/1997 | Freeman et al. |
| 5,846,134 A | 12/1998 | Latypov |
| 5,852,672 A | 12/1998 | Lu |
| 5,862,256 A | 1/1999 | Zetts et al. |
| 5,864,635 A | 1/1999 | Zetts et al. |
| 5,870,196 A | 2/1999 | Lulli et al. |
| 5,917,937 A | 6/1999 | Szeliski et al. |
| 5,973,700 A | 10/1999 | Taylor et al. |
| 6,002,808 A | 12/1999 | Freeman |
| 6,005,548 A | 12/1999 | Latypov et al. |
| 6,064,387 A | 5/2000 | Canaday et al. |
| 6,072,494 A | 6/2000 | Nguyen |
| 6,084,979 A | 7/2000 | Kanade et al. |
| 6,111,580 A | 8/2000 | Kazama et al. |
| 6,191,773 B1 | 2/2001 | Maruno et al. |
| 6,215,890 B1 | 4/2001 | Matsuo et al. |
| 6,243,054 B1 | 6/2001 | DeLuca |
| 6,252,988 B1 | 6/2001 | Ho |
| 6,256,033 B1 | 7/2001 | Nguyen |
| 6,262,740 B1 | 7/2001 | Lauer et al. |
| 6,345,111 B1 | 2/2002 | Yamaguchi et al. |
| 6,345,893 B2 | 2/2002 | Fateh et al. |
| 6,452,584 B1 | 9/2002 | Walker et al. |
| 6,456,262 B1 | 9/2002 | Bell |
| 6,507,353 B1 | 1/2003 | Huard et al. |
| 6,512,838 B1 | 1/2003 | Rafii et al. |
| 6,519,363 B1 | 2/2003 | Su et al. |
| 6,559,813 B1 | 5/2003 | DeLuca et al. |
| 6,681,031 B2 | 1/2004 | Cohen et al. |
| 6,686,921 B1 | 2/2004 | Rushmeier et al. |
| 6,690,370 B2 | 2/2004 | Ellenby et al. |
| 6,741,251 B2 | 5/2004 | Malzbender |
| 6,791,540 B1 | 9/2004 | Baumberg |
| 6,803,928 B2 | 10/2004 | Bimber et al. |
| 6,853,935 B2 | 2/2005 | Satoh et al. |
| 6,857,746 B2 | 2/2005 | Dyner |
| 6,951,515 B2 | 10/2005 | Ohshima et al. |
| 6,977,654 B2 | 12/2005 | Malik et al. |
| 7,003,134 B1 | 2/2006 | Covell et al. |
| 7,013,046 B2 | 3/2006 | Kawamura et al. |
| 7,023,436 B2 | 4/2006 | Segawa et al. |
| 7,042,440 B2 | 5/2006 | Pryor et al. |
| 7,042,442 B1 | 5/2006 | Kanevsky et al. |
| 7,151,530 B2 | 12/2006 | Roeber et al. |
| 7,170,492 B2 | 1/2007 | Bell |
| 7,215,815 B2 | 5/2007 | Honda |
| 7,227,526 B2 | 6/2007 | Hildreth et al. |
| 7,257,237 B1 | 8/2007 | Luck et al. |
| 7,259,747 B2 | 8/2007 | Bell |
| 7,264,554 B2 | 9/2007 | Bentley |
| 7,289,227 B2 | 10/2007 | Smetak et al. |
| 7,289,645 B2 | 10/2007 | Yamamoto et al. |
| 7,295,697 B1 | 11/2007 | Satoh |
| 7,301,648 B2 | 11/2007 | Foxlin |
| 7,302,099 B2 | 11/2007 | Zhang et al. |
| 7,333,113 B2 | 2/2008 | Gordon |
| 7,340,077 B2 | 3/2008 | Gokturk |
| 7,348,963 B2 | 3/2008 | Bell |
| 7,358,972 B2 | 4/2008 | Gordon et al. |
| 7,370,883 B2 | 5/2008 | Basir et al. |
| 7,427,996 B2 | 9/2008 | Yonezawa et al. |
| 7,428,542 B1 | 9/2008 | Fink et al. |
| 7,433,024 B2 * | 10/2008 | Garcia et al. .............. 356/4.01 |
| 7,474,256 B2 | 1/2009 | Ohta et al. |
| 7,508,377 B2 | 3/2009 | Pihlaja et al. |
| 7,526,120 B2 | 4/2009 | Gokturk et al. |
| 7,536,032 B2 | 5/2009 | Bell |
| 7,573,480 B2 | 8/2009 | Gordon |
| 7,576,727 B2 | 8/2009 | Bell |
| 7,580,572 B2 | 8/2009 | Bang et al. |
| 7,590,941 B2 | 9/2009 | Wee et al. |
| 7,688,998 B2 | 3/2010 | Tuma et al. |
| 7,696,876 B2 | 4/2010 | Dimmer et al. |
| 7,724,250 B2 | 5/2010 | Ishii et al. |
| 7,762,665 B2 | 7/2010 | Vertegaal et al. |
| 7,774,155 B2 | 8/2010 | Sato et al. |
| 7,812,842 B2 | 10/2010 | Gordon |
| 7,821,541 B2 | 10/2010 | Delean |
| 7,840,031 B2 | 11/2010 | Albertson et al. |
| 7,844,914 B2 | 11/2010 | Andre et al. |
| 7,925,549 B2 | 4/2011 | Looney et al. |
| 7,971,156 B2 | 6/2011 | Albertson et al. |
| 8,154,781 B2 | 4/2012 | Kroll et al. |
| 8,166,421 B2 | 4/2012 | Magal et al. |
| 8,183,977 B2 | 5/2012 | Matsumoto |
| 8,194,921 B2 | 6/2012 | Kongqiao et al. |
| 8,214,098 B2 | 7/2012 | Murray et al. |
| 8,218,211 B2 | 7/2012 | Kroll et al. |
| 8,368,647 B2 | 2/2013 | Lin |
| 8,405,604 B2 | 3/2013 | Pryor et al. |
| 8,416,276 B2 | 4/2013 | Kroll et al. |
| 8,446,459 B2 | 5/2013 | Fang et al. |
| 8,448,083 B1 | 5/2013 | Migos et al. |
| 8,462,199 B2 | 6/2013 | Givon |
| 8,514,221 B2 | 8/2013 | King et al. |
| 8,514,251 B2 | 8/2013 | Hildreth et al. |
| 8,625,882 B2 * | 1/2014 | Backlund et al. ............. 382/154 |
| 2002/0057383 A1 | 5/2002 | Iwamura |
| 2002/0071607 A1 | 6/2002 | Kawamura et al. |
| 2002/0158873 A1 | 10/2002 | Williamson |
| 2003/0057972 A1 | 3/2003 | Pfaff et al. |
| 2003/0063775 A1 | 4/2003 | Rafii et al. |
| 2003/0088463 A1 | 5/2003 | Kanevsky |
| 2003/0156756 A1 | 8/2003 | Gokturk et al. |
| 2003/0185444 A1 | 10/2003 | Honda |
| 2003/0227453 A1 | 12/2003 | Beier et al. |
| 2003/0235341 A1 | 12/2003 | Gokturk et al. |
| 2004/0046744 A1 | 3/2004 | Rafii et al. |
| 2004/0104935 A1 | 6/2004 | Williamson |
| 2004/0135744 A1 | 7/2004 | Bimber et al. |
| 2004/0155962 A1 | 8/2004 | Marks |
| 2004/0174770 A1 | 9/2004 | Rees |
| 2004/0183775 A1 | 9/2004 | Bell |
| 2004/0184640 A1 | 9/2004 | Bang et al. |
| 2004/0184659 A1 | 9/2004 | Bang et al. |
| 2004/0193413 A1 | 9/2004 | Wilson et al. |
| 2004/0258314 A1 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0110964 A1 | 5/2005 | Bell et al. |
| 2005/0122308 A1 | 6/2005 | Bell et al. |
| 2005/0162381 A1 | 7/2005 | Bell et al. |
| 2005/0190972 A1 | 9/2005 | Thomas et al. |
| 2005/0254726 A1 | 11/2005 | Fuchs et al. |
| 2005/0265583 A1 | 12/2005 | Covell et al. |
| 2006/0010400 A1 | 1/2006 | Dehlin et al. |
| 2006/0092138 A1 | 5/2006 | Kim et al. |
| 2006/0110008 A1 | 5/2006 | Vertegaal et al. |
| 2006/0115155 A1 | 6/2006 | Lui et al. |
| 2006/0139314 A1 | 6/2006 | Bell |
| 2006/0149737 A1 | 7/2006 | Du et al. |
| 2006/0159344 A1 | 7/2006 | Shao et al. |
| 2006/0187196 A1 | 8/2006 | Underkoffler et al. |
| 2006/0239670 A1 | 10/2006 | Cleveland |
| 2006/0248475 A1 | 11/2006 | Abrahamsson |
| 2007/0078552 A1 | 4/2007 | Rosenberg |
| 2007/0130547 A1 | 6/2007 | Boillot |
| 2007/0154116 A1 | 7/2007 | Shieh |
| 2007/0230789 A1 | 10/2007 | Chang et al. |
| 2007/0285554 A1 | 12/2007 | Givon |
| 2008/0030460 A1 | 2/2008 | Hildreth et al. |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0170776 A1 | 7/2008 | Albertson et al. |
| 2008/0236902 A1 | 10/2008 | Imaizumi |
| 2008/0252596 A1 | 10/2008 | Bell et al. |

(56) References Cited

U.S. PATENT DOCUMENTS

| | | |
|---|---|---|
| 2008/0256494 A1 | 10/2008 | Greenfield |
| 2008/0260250 A1 | 10/2008 | Vardi |
| 2008/0281583 A1 | 11/2008 | Slothouber et al. |
| 2008/0287189 A1 | 11/2008 | Rabin |
| 2009/0009593 A1 | 1/2009 | Cameron et al. |
| 2009/0027335 A1 | 1/2009 | Ye |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0073117 A1 | 3/2009 | Tsurumi et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1* | 7/2009 | Magal et al. ............... 715/863 |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0284542 A1 | 11/2009 | Baar et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0071965 A1 | 3/2010 | Hu et al. |
| 2010/0083189 A1 | 4/2010 | Arlein et al. |
| 2010/0103106 A1 | 4/2010 | Chui |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1 | 8/2010 | Latta et al. |
| 2010/0199231 A1 | 8/2010 | Markovic et al. |
| 2010/0234094 A1 | 9/2010 | Gagner et al. |
| 2010/0235786 A1 | 9/2010 | Maizels et al. |
| 2010/0295781 A1 | 11/2010 | Alameh et al. |
| 2011/0006978 A1 | 1/2011 | Yuan |
| 2011/0007035 A1 | 1/2011 | Shai |
| 2011/0018795 A1 | 1/2011 | Jang |
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0087970 A1 | 4/2011 | Swink et al. |
| 2011/0144543 A1 | 6/2011 | Tsuzuki et al. |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0242102 A1 | 10/2011 | Hess |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0296353 A1 | 12/2011 | Ahmed et al. |
| 2011/0310010 A1 | 12/2011 | Hoffnung et al. |
| 2012/0001875 A1 | 1/2012 | Li et al. |
| 2012/0038550 A1 | 2/2012 | Lemmey et al. |
| 2012/0078614 A1 | 3/2012 | Galor et al. |
| 2012/0117514 A1 | 5/2012 | Kim et al. |
| 2012/0169583 A1 | 7/2012 | Rippel et al. |
| 2012/0202569 A1 | 8/2012 | Maizels et al. |
| 2012/0204133 A1 | 8/2012 | Guendelman et al. |
| 2012/0223882 A1 | 9/2012 | Galor et al. |
| 2012/0249416 A1 | 10/2012 | Maciocci et al. |
| 2012/0268369 A1 | 10/2012 | Kikkeri |
| 2012/0275680 A1 | 11/2012 | Omi |
| 2012/0313848 A1 | 12/2012 | Galor et al. |
| 2012/0320080 A1 | 12/2012 | Giese et al. |
| 2013/0002801 A1 | 1/2013 | Mock |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0155070 A1 | 6/2013 | Luo |
| 2013/0207920 A1 | 8/2013 | McCann et al. |
| 2014/0010425 A1* | 1/2014 | Gurman ................ 382/128 |
| 2014/0108930 A1* | 4/2014 | Asnis ................ 715/716 |

FOREIGN PATENT DOCUMENTS

| | | |
|---|---|---|
| WO | 2004107272 A1 | 12/2004 |
| WO | 2005003948 A1 | 1/2005 |
| WO | 2005094958 A1 | 10/2005 |
| WO | 2007043036 A1 | 4/2007 |
| WO | 2007078639 A1 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2012011044 A1 | 1/2012 |
| WO | 2012020380 A1 | 2/2012 |
| WO | 2012107892 A1 | 8/2012 |

OTHER PUBLICATIONS

Bleiwess et al., "Markerless Motion Capture Using a Single Depth Sensor", SIGGRAPH Asia 2009, Yokohama, Japan, Dec. 16-19, 2009.

Bevilacqua et al., "People Tracking Using a Time-Of-Flight Depth Sensor", Proceedings of the IEEE International Conference on Video and Signal Based Surveillance, Sydney, Australia, Nov. 22-24, 2006.

Bradski, G., "Computer Vision Face Tracking for Use in a Perceptual User Interface", Intel Technology Journal, vol. 2, issue 2 (2nd Quarter 2008).

Comaniciu et al., "Kernel-Based Object Tracking", IEEE Transactions on Pattern Analysis and Machine Intelligence, vol. 25, No. 5, pp. 564-577, May 2003.

Gesturetec Inc., "Gesture Control Solutions for Consumer Devices", Canada, 2009.

Gokturk et al., "A Time-of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.

Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.

Haritaoglu et al., "Ghost 3d: Detecting Body Posture and Parts Using Stereo", Proceedings of the IEEE Workshop on Motion and Video Computing (Motion'02), pp. 175-180, Orlando, USA, Dec. 5-6, 2002.

Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.

Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.

Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.

Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.

(56) References Cited

OTHER PUBLICATIONS

Kolb et al "ToF-Sensos: New Dimensions for Realism and Interactivity", Proceedings of the IEEE Conference on Computer Vision and Patter Recognition Workshops, pp. 1-6, Anchorage, USA, Jun. 23-28, 2008.

Kolsch et al, "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.

Krumm et al., "Multi-Camera Multi-Person Tracking for EasyLiving", 3rd IEEE International Workshop on Visual Surveillance, Dublin, Ireland, Jul. 1, 2000.

Leens et al., "Combining Color, Depth, and Motion for Video Segmentation", ICVS 2009—7th International Conference on Computer Vision Systems, Liege, Belgium Oct. 13-15, 2009.

MacCormick et al., "Partitioned Sampling, Articulated Objects, and Interface-Quality Hand Tracking", ECCV '00—Proceedings of the 6th European Conference on Computer Vision—Part II, pp. 3-19, Dublin, Ireland, Jun. 26-Jul. 1, 2000.

Malassiotis et al., "Real-Time Hand Posture Recognition Using Range Data", Image and Vision Computing, vol. 26, No. 7, pp. 1027-1037, Jul. 2, 2008.

Morano et al., "Structured Light Using Pseudorandom Codes", IEEE Transactions on Pattern Analysis and Machine Intelligence, vol. 20, issue 3, pp. 322-327, Mar. 1998.

Munoz-Salinas et al., "People Detection and Tracking Using Stereo Vision and Color", Image and Vision Computing, vol. 25, No. 6, pp. 995-1007, Jun. 1, 2007.

Nanda et al., "Visual Tracking Using Depth Data", Proceedings of the 2004 Conference on Computer Vision and Patter Recognition Workshop, vol. 3, Washington, USA, Jun. 27-Jul. 2, 2004.

Scharstein et al., "High-Accuracy Stereo Depth Maps Using Structured Light", IEEE Conference on Computer Vision and Patter Recognition, vol. 1, pp. 195-2002, Madison, USA, Jun. 2003.

Shi et al., "Good Features to Track", IEEE Conference on Computer Vision and Pattern Recognition, pp. 593-600, Seattle, USA, Jun. 21-23, 1994.

Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.

Softkinetic S.A. ISSU™—3D Gesture Recognition Platform for Developers of 3D Applications, Belgium, Brussels, 2007-2010.

Sudderth et al., "Visual Hand Tracking Using Nonparametric Belief Propagation", IEEE Workshop on Generative Model Based Vision at CVPR'04, Washington, USA, Jun. 27-Jul. 2, 2004.

Tsap, L. "Gesture-Tracking in Real Time with Dynamic Regional Range Computation", Real-Time Imaging, vol. 8, issue 2, pp. 115-126, Apr. 2002.

Xu et al., "A Multi-Cue-Based Human Body Tracking System", Proceedings of the 5ths International Conference on Computer Vision Systems (ICVS 2007), Germany, Mar. 21-24, 2007.

Xu et al., "Human Detecting Using Depth and Gray Images", Proceedings of the IEE Conference on Advanced Video and Signal Based Surveillance (AVSS'03), Miami, USA, Jul. 21-22, 2003.

Yilmaz et al., "Object Tracking: A Survey", ACM Computing Surveys, vol. 38, No. 4, article 13, Dec. 2006.

Zhu et al., "Controlled Human Pose Estimation From Depth Image Streams", IEEE Conference on Computer Vision and Patter Recognition Workshops, pp. 1-8, Anchorage, USA, Jun. 23-27, 2008.

International Application PCT/IB2010/051055 Search Report dated Sep. 1, 2010.

La Viola, J. Jr., "Whole-Hand and Speech Input in Virtual Environments", Computer Science Department, Florida Atlantic University, USA, 1996.

Martell, C., "Form: An Experiment in the Annotation of the Kinematics of Gesture", Dissertation, Computer and Information Science, University of Pennsylvania, 2005.

U.S. Appl. No. 12/352,622 Official Action dated Mar. 31, 2011.

Prime Sense Inc., "Prime Sensor™ NITE 1.1 Framework Programmer's Guide", Version 1.2, year 2009.

Primesense Corporation, "PrimeSensor Reference Design 1.08", USA, year 2010.

U.S. Appl. No. 13/592,352, filed Aug. 23, 2012.
U.S. Appl. No. 61/615,403, filed Mar. 26, 2012.
U.S. Appl. No. 61/603,949, filed Feb. 28, 2012.
U.S. Appl. No. 61/525,771, filed Aug. 21, 2011.
U.S. Appl. No. 61/663,638, filed Jun. 25, 2012.
U.S. Appl. No. 61/538,970, filed Sep. 26, 2011.
U.S. Appl. No. 13/592,369, filed Aug. 23, 2012.

International Application PCT/IB2011/053192 Search Report dated Dec. 6, 2011.

U.S. Appl. No. 13/314,210, filed Dec. 8, 2011.
U.S. Appl. No. 12/352,622 Official Action dated Sep. 30, 2011.

Sun et al., "SRP Based Natural Interaction Between Real and Virtual Worlds in Augmented Reality", Proceedings of the International Conference on Cyberworlds (CW'08), pp. 117-124, Sep. 22-24, 2008.

Schmalstieg et al., "The Studierstube Augmented Reality Project", Presence: Teleoperators and Virtual Environments, vol. 11, No. 1, pp. 33-54, Feb. 2002.

Ohta et al., "Share-Z: Client/Server Depth Sensing for See-Through Head-Mounted Displays", Presence: Teleoperators and Virtual Environments, vol. 11, No. 2, pp. 176-188, Apr. 2002.

Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.

Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.

U.S. Appl. No. 61/652,899, filed May 30, 2012.

ZRRO Ltd., "TeleTouch Device", year 2011 (http://www.zrro.com/products.html).

U.S. Appl. No. 13/584,831, filed Aug. 14, 2012.

Hart, D., U.S. Appl. No. 09/616,606 "Method and System for High Resolution, Ultra Fast 3-D Imaging", filed Jul. 14, 2000.

International Application PCT/IL2007/000306 Search Report dated Oct. 2, 2008.

International Application PCT/IL2007/000574 Search Report dated Sep. 10, 2008.

International Application PCT/IL2006/000335 Preliminary Report on Patentability dated Apr. 24, 2008.

Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.

LeClerc et al., "The direct computation of height from shading", The Proceedings of the IEEE Computer Society Conference on Computer Vision and Pattern Recognition (CVPR), pp. 552-558, USA, Jun. 1991.

Zhang et al., "Shape from intensity gradient", IEEE Transactions on Systems, Man and Cybernetics—Part A: Systems and Humans, vol. 29, No. 3, pp. 318-325, May 1999.

Zhang et al., "Height recovery from intensity gradients", IEEE Computer Society Conference on Computer Vision and Pattern Recognition (CVPR), pp. 508-513, Jun. 21-23, 1994.

Horn, B., "Height and gradient from shading", International Journal of Computer Vision, vol. 5, No. 1, pp. 37-76, Aug. 1990.

Bruckstein, A., "On shape from shading", Computer Vision, Graphics & Image Processing, vol. 44, pp. 139-154, year 1988.

Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.

Besl, P., "Active, Optical Range Imaging Sensors", Machine vision and applications, vol. 1, pp. 127-152, year 1988.

Horn et al., "Toward optimal structured light patterns", Proceedings of International Conference on Recent Advances in 3D Digital Imaging and Modeling, pp. 28-37, Ottawa, Canada, May 1997.

(56) References Cited

OTHER PUBLICATIONS

Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Worskhop on Evaluation of Articulated Human Motion and Pose Estimation, 2007.

Microvision Inc., "PicoP® Display Engine—How it Works", 1996-2012.
Primesense Corporation, "PrimeSensor Nite 1.1", USA, year 2010.
Arm Ltd, "AMBA Specification: AHB", Version 2, pp. 35-92, year 1999.
Commission Regulation (EC) No. 1275/2008, Official Journal of the European Union, Dec. 17, 2008.
Primesense, "Natural Interaction", YouTube Presentation, Jun. 9, 2010 http://www.youtube.com/watch?v=TzLKsex43zI~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Noveron, "Madison video eyewear", year 2012.
International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Galor, M., U.S. Appl. No. 13/778,172 "Asymmetric Mapping in Tactile and Non-Tactile User Interfaces", filed Feb. 27, 2013.
Berenson et al., U.S. Appl. No. 13/904,050 "Zoom-based gesture user interface", filed May 29, 2013.
Berenson et al., U.S. Appl. No. 13/904,052 "Gesture-based interface with enhanced features", filed May 29, 2013.
Bychkov et al., U.S. Appl. No. 13/849,514 "Gaze-enhanced Virtual Touchscreen", filed Mar. 24, 2013.
Guendelman et al., U.S. Appl. No. 13/849,514 "Enhanced Virtual Touchpad", filed Mar. 24, 2013.
Miller, R., "Kinect for XBox 360 Review", Engadget, Nov. 4, 2010.
U.S. Appl. No. 13/161,508 Office Action dated Sep. 9, 2013.
International Application PCT/IB2013/052332 Search Report dated Aug. 26, 2013.
U.S. Appl. No. 13/314,210 Office Action dated Jul. 19, 2013.
U.S. Appl. No. 13/314,207 Office Action dated Aug. 5, 2013.
U.S. Appl. No. 13/423,322 Office Action dated Apr. 7, 2014.

(56) References Cited

OTHER PUBLICATIONS

U.S. Appl. No. 13/584,831 Office Action dated Mar. 20, 2014.
U.S. Appl. No. 13/314,207 Office Action dated Apr. 3, 2014.
U.S. Appl. No. 12/683,452 Office Action dated Jan. 22, 2014.
U.S. Appl. No. 12/314,210 Office Action dated Jan. 10, 2014.
U.S. Appl. No. 13/592,352 Office Action dated Feb. 13, 2014.
Nakamura et al, "Occlusion detectable stereo-occlusion patterns in camera matrix", Proceedings of the 1996 Conference on Computer Vision and Pattern Recognition (CVPR '96), pp. 371-378, Jun. 1996.
U.S. Appl. No. 13/592,352 Office Action dated May 7, 2014.
U.S. Appl. No. 12/721,582 Office Action dated Apr. 17, 2014.
U.S. Appl. No. 14/055,997 Office Action dated May 28, 2014.
U.S. Appl. No. 13/584,831 Office Action dated Jul. 8, 2014.
U.S. Appl. No. 13/423,314 Office Action dated Jul. 31, 2014.
U.S. Appl. No. 12/683,452 Office Action dated Jul. 16, 2014.
U.S. Appl. No. 13/423,314 Advisory Action dated Jun. 26, 2014.
Slinger et al, "Computer—Generated Holography as a Generic Display Technology", IEEE Computer, vol. 28, Issue 8, pp. 46-53, Aug. 2005.
Hilliges et al, "Interactions in the air: adding further depth to interactive tabletops", Proceedings of the 22nd annual ACM symposium on User interface software and technology, ACM, pp. 139-148, Oct. 2009.

* cited by examiner

ZOOM-BASED GESTURE USER INTERFACE

CROSS-REFERENCE TO RELATED APPLICATIONS

This application claims the benefit of U.S. Provisional Patent Application 61/504,339, filed Jul. 5, 2011, of U.S. Provisional Patent Application 61/521,448, filed Aug. 9, 2011, and of U.S. Provisional Patent Application 61/523,349, filed Aug. 14, 2011, all of which are incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a user interface method, including presenting by a computer executing a user interface, multiple interactive items on a display, capturing a first sequence of images indicating a position in space of a hand of a user in proximity to the display, responsively to the position, associating one of the interactive items with the hand, after associating the item, capturing a second sequence of images indicating a movement of the hand, and responsively to the movement, changing a size of the one of the items on the display.

There is also provided, in accordance with an embodiment of the present invention, a user interface method, including presenting by a computer executing a user interface, multiple interactive items on a display, capturing a first sequence of images indicating a position in space of a hand of a user in proximity to the display, capturing a second sequence of images indicating a movement of the hand transverse to the display in a first direction, and responsively to the movement, panning the interactive items on the display in a second direction, which is different from the first direction.

There is further provided, in accordance with an embodiment of the present invention, a user interface method, including presenting by a computer executing a user interface, multiple interactive items on a display, receiving, from a handheld remote control device coupled to the computer, a first signal indicating a position in space of a hand of a user in proximity to the handheld remote control device, responsively to the position, associating one of the interactive items with the hand, after associating the item, receiving from the handheld remote control device a second signal indicating a movement of the hand relative to the handheld remote control device, and responsively to the movement, changing a size of the one of the interactive items on the display.

There is additionally provided, in accordance with an embodiment of the present invention, an apparatus, including a sensing device, and a computer executing a user interface and configured to present multiple interactive items on a display coupled to the computer, to capture a first sequence of images indicating a position in space of a hand of a user in proximity to the display, to associate, responsively to the position, a given one of the interactive items with the hand, to capture, after associating the given interactive item, a second sequence of images indicating a movement of the hand and to change a size of, responsively to the movement, the given interactive item on the display.

There is also provided, in accordance with an embodiment of the present invention, an apparatus, including a sensing device, and a computer executing a user interface and configured to present multiple interactive items on a display coupled to the computer, to capture a first sequence of images indicating a position in space of a hand of a user in proximity to the display, to capture a second sequence of images indicating a movement of the hand transverse to the display in a first direction, and responsively to the movement, to pan the interactive items on the display in a second direction, which is different from the first direction.

There is further provided, in accordance with an embodiment of the present invention, an apparatus, including a sensing device, and a computer executing a user interface and configured to present multiple interactive items on a display coupled to the computer, to receive, from a handheld remote control device coupled to the computer, a first signal indicating a position in space of a hand of a user in proximity to the handheld remote control device, to associate, responsively to the position, one of the interactive items with the hand, to receive from the handheld remote control device, after associating the item, a second signal indicating a movement of the hand relative to the handheld remote control device, to change, responsively to the movement, a size of the one of the interactive items on the display.

There is additionally provided, in accordance with an embodiment of the present invention, a computer software product, including a non-transitory computer-readable medium, in which program instructions are stored, which instructions, when read by a computer, cause the computer to present multiple interactive items on a display, to capture a first sequence of images indicating a position in space of a hand of a user in proximity to the display, to associate, responsively to the position, a given one of the interactive items with the hand, to capture, after associating the given interactive item, a second sequence of images indicating a movement of the hand, and to change, responsively to the movement, a size of the given interactive item on the display.

There is also provided, in accordance with an embodiment of the present invention, a computer software product, including a non-transitory computer-readable medium, in which program instructions are stored, which instructions, when read by a computer, cause the computer to present multiple interactive items on a display, to capture a first sequence of images indicating a position in space of a hand of a user in proximity to the display, to capture a second sequence of images indicating a movement of the hand transverse to the display in a first direction, and to pan, responsively to the movement, the interactive items on the display in a second direction, which is different from the first direction.

There is further provided, in accordance with an embodiment of the present invention, a computer software product, including a non-transitory computer-readable medium, in which program instructions are stored, which instructions, when read by a computer, cause the computer to present multiple interactive items on a display, to receive, from a handheld remote control device coupled to the computer, a first signal indicating a position in space of a hand of a user in proximity to the handheld remote control device, to associate, responsively to the position, one of the interactive items with the hand, to receive from the handheld remote control device, after associating the item, receiving, a second signal indicating a movement of the hand relative to the handheld remote control device, and to change, responsively to the movement, a size of the one of the interactive items on the display.

BRIEF DESCRIPTION OF THE DRAWINGS

The disclosure is herein described, by way of example only, with reference to the accompanying drawings, wherein.

DETAILED DESCRIPTION OF EMBODIMENTS

When using physical tactile input devices such as buttons, rollers or touch screens, a user typically engages and disengages control of a user interface by touching and/or manipulating the physical device. Embodiments of the present invention describe methods and mechanism for interacting with a display coupled to a computer executing a non-tactile zoom-based user interface that includes three-dimensional (3D) sensing, by a 3D sensor, of motion or change of position of one or more body parts, typically a hand or a finger, of the user.

In some embodiments the zoom-based user interface utilizes a ZoomGrid control scheme that enables the user to select a given interactive item from multiple interactive items presented on a display. The ZoomGrid control scheme described hereinbelow enables the user to select a specific interactive item from any size pile of interactive items (also called a ZoomGrid surface), by performing continuous gestures using the user's hands and/or fingers. The ZoomGrid paradigm described herein is not limited to selection of interactive items and can be easily extended to selection of actions on a given interactive item.

In some embodiments, the user identifies one of the multiple presented items, and reaches out a hand toward the identified item. As the user starts to pull the ZoomGrid surface that includes the identified item, the zoom-based user interface zooms in to the region where the desired interactive item is presented. Finally, the user continues to pull, and adjust his/her hand's movement until the computer zooms in on the identified item, and the identified item is large enough (e.g., covering the entire display) to be regarded as selected.

As explained hereinbelow, the user typically does not need to aim accurately when initially reaching out toward the region that includes the identified item. While pulling on the ZoomGrid surface, the user can "zero in" on the identified item by moving his/her hand transversely along a horizontal X-axis and/or a vertical Y-axis.

Embodiments of the current invention described herein provide methods and mechanisms for users to "dive" into piles of hierarchical information that are presented on a display. In some embodiments, a Multi-Level ZoomGrid control scheme enables users to dive into a subject by literally pulling interesting topics (presented as interactive items) further and further out of piles of presented topics that are hierarchically presented to them.

System Description

Figure 1:
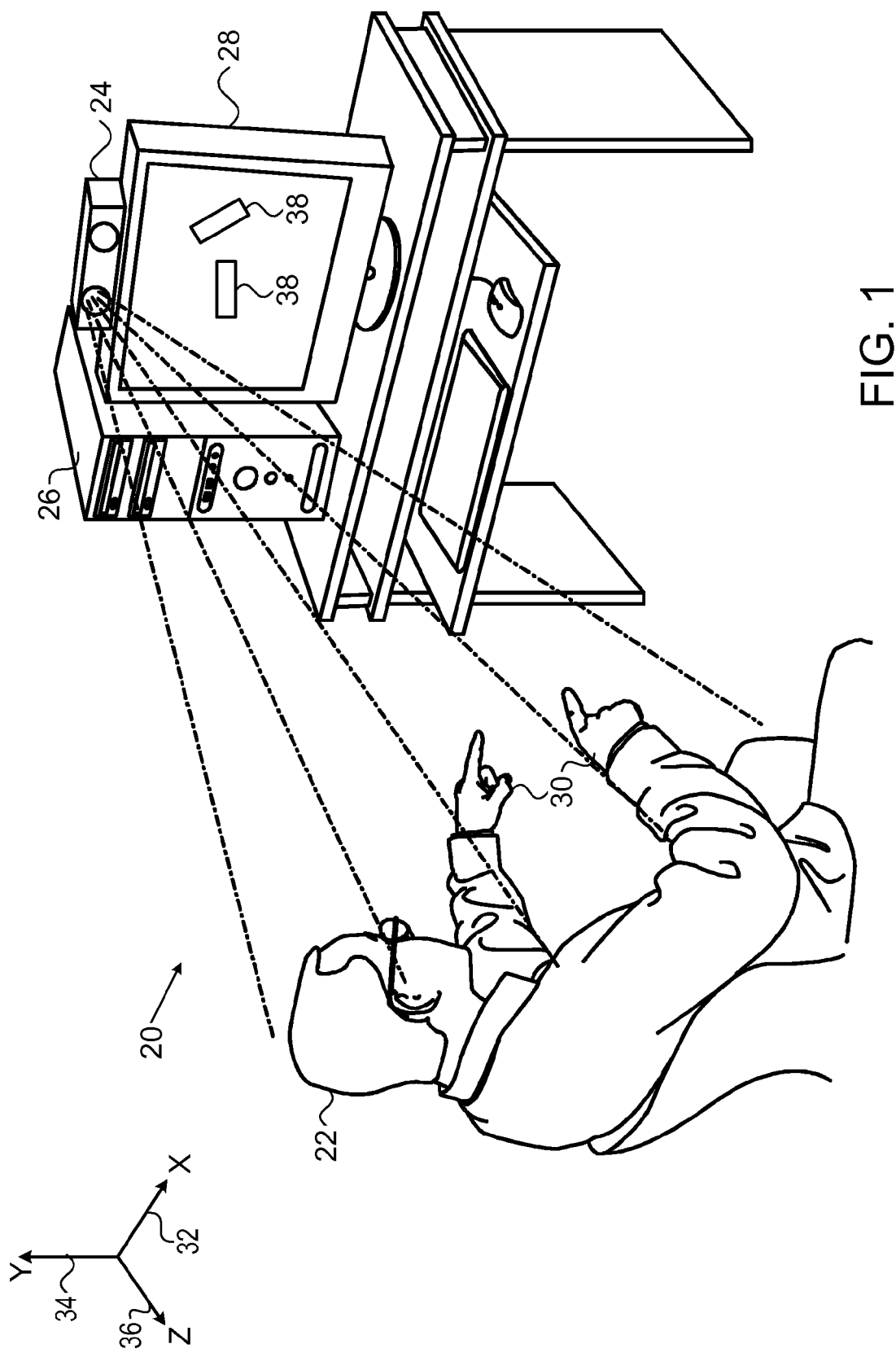
FIG. 1 is a schematic, pictorial illustration of a computer system implementing a non-tactile zoom-based user interface, in accordance with an embodiment of the present invention.

FIG. 1 is a schematic, pictorial illustration of a non-tactile zoom-based interface 20 (also referred to herein as the zoom-based interface) for operation by a user 22 of a computer 26, in accordance with an embodiment of the present invention. The non-tactile zoom-based interface is based on a 3D sensing device 24 coupled to the computer, which captures 3D scene information of a scene that includes the body (or at least a body part, such as one or more of hands 30) of the user. Device or a separate camera (not shown in the figures) may also capture video images of the scene. The information captured by device 24 is processed by computer 26, which drives a display 28 so as to present and manipulate on-screen interactive items 38. Details of the operation of 3D sensing device 24 are described in U.S. Patent Application 2010/0007717, filed on Mar. 4, 2009, whose disclosure is incorporated herein by reference.

Computer 26, executing zoom-based interface 20, processes data generated by device 24 in order to reconstruct a 3D map of user 22. The term "3D map" refers to a set of 3D coordinates measured, by way of example, with reference to a generally horizontal X-axis 32 in space, a generally vertical Y-axis 34 in space and a depth Z-axis 36 in space, based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Zoomgrid Surfaces

Figure 2:
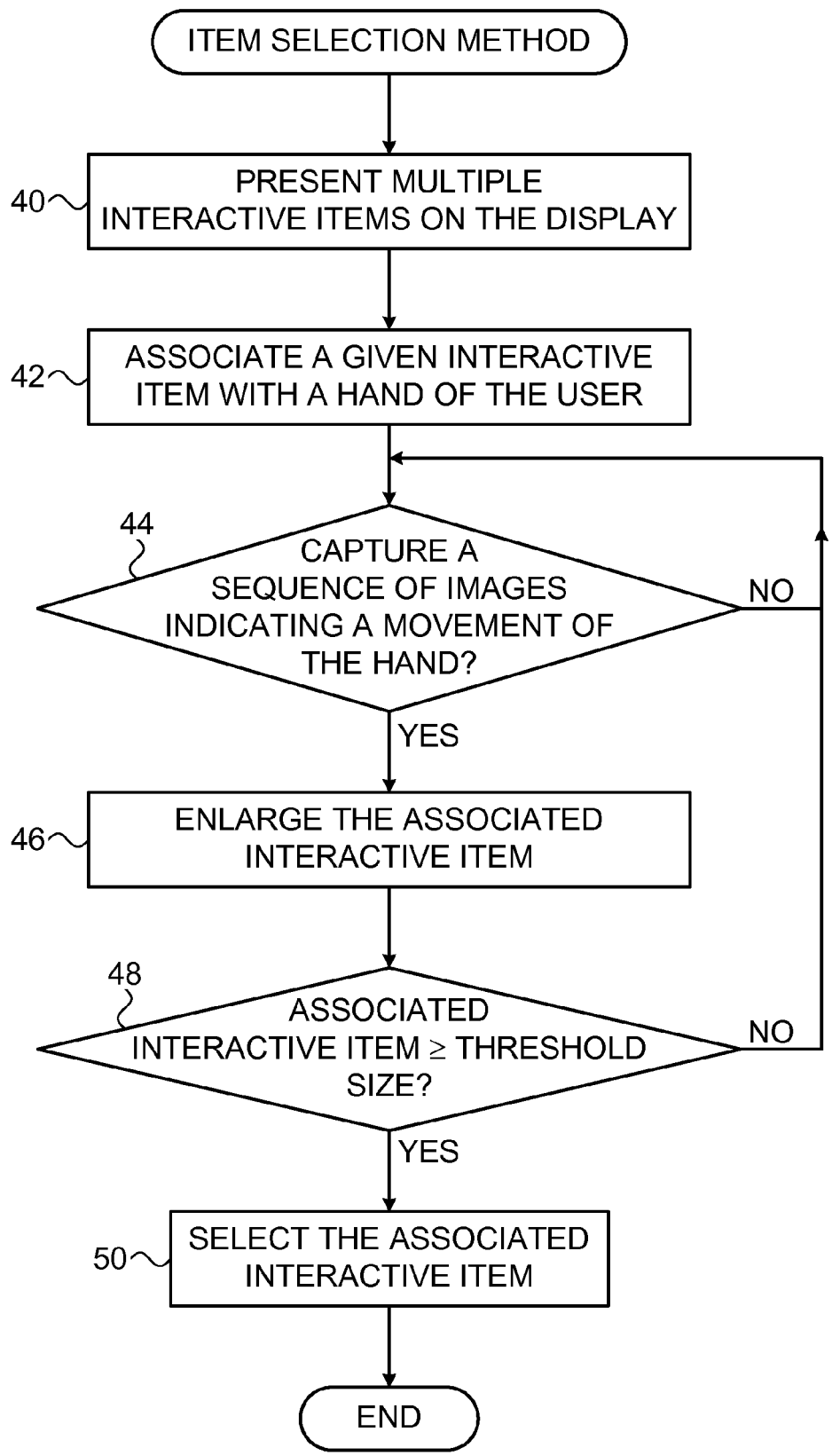
FIG. 2 is a flow diagram that schematically illustrates a method of interacting with the zoom-based user interface and selecting a given on-screen interactive item, in accordance with an embodiment of the present invention.

FIG. 2 is a flow diagram that schematically illustrates a method of selecting a given interactive item 38 via a zoom-based user interface 20, in accordance with an embodiment of the present invention. In a presentation step 40, computer 26 presents multiple interactive items 38 on display 28. Computer 28 can present the interactive items in either an organized or unorganized form. Examples of organized forms are described in FIGS. 4A-4C hereinbelow.

In an association step 42, computer 26 associates hand 30 with a given interactive item 38 presented on display 28. To associate given interactive item, computer 26 captures a first sequence of images indicating a position of hand 30 in space, and associates hand 30 with the given interactive item (also referred to herein as the active item). Upon capturing the first sequence of images from sensing device 24, computer 26 may generate corresponding 3D maps of at least a body part of user 22 (including hand 30) in proximity to display 28.

In some embodiments, the active item comprises the interactive item in closest proximity to a center of display 28. In alternative embodiments, computer 26 can identify a given interactive item 38 based on the user's gaze or on a pointing gesture performed by hand 30, and associate hand 30 with the given interactive item. Identifying a given interactive item presented on display 28 based on a gaze and/or a pointing gesture is described in PCT International Application PCT/IB2012/050577, filed Feb. 9, 2012, whose disclosure is incorporated herein by reference.

In some embodiments, computer 26 can initiate the association of hand 30 with a given interactive item 38 upon the first sequence of images indicating a first specific gesture performed by the user. For example, the first gesture may comprise the user raising hand 30 or moving hand 30 toward display 28. The first gesture may also include a Grab gesture, which comprises the user closing at least some fingers of hand 30. Likewise, computer 26 can cancel the association of hand 30 with a given interactive item 38, upon detecting a second specific gesture performed by the user. For example, the second specific gesture may comprise a Release gesture, which comprises the user opening the fingers of the hand. The Grab and the Release gestures are described in U.S. patent application Ser. No. 13/423,314, filed on Mar. 19, 2012, whose disclosure is incorporated herein by reference.

Incorporating the Grab and the Release gestures into zoom-based user interface 20 can be particularly useful when there are multiple users positioned within a field of view of sensing device 24. For example, a first given user can engage zoom-based user interface 20 by performing a Grab gesture, and disengage from the user interface by performing a Release gesture, thereby enabling a second given user to engage the user interface.

As user 22 performs the first gesture (e.g., the user keeps the fingers of the hand closed after initiating the Grab gesture), computer 26 may respond to any additional movement of hand 30 that was indicated in the first sequence of images. For example, if computer 26 detects user 22 moving hand 30 in a transverse motion (i.e., a side-to-side motion along X-axis 32, or an upward or downward motion along Y-axis 34) while hand 30 is "open" (i.e., the user has not closed the fingers of hand 30 to perform a Grab gesture), the computer can associate the hand with a different interactive item 38 presented on the display. In some embodiments (as described hereinbelow), if the user moves hand 30 in a transverse motion while performing a Grab gesture, computer 26 can scroll the interactive items presented on display 28.

In a first comparison step 44, computer 26 captures a second sequence of images until the computer detects a movement of hand 30. Upon detecting a movement of hand 30, in a resizing step 46, computer 26 responsively changes the size of the given interactive item associated with the hand. In some embodiments, changing the size of the given interactive item comprises enlarging the given interactive item on display 28. For example, computer 26 can enlarge the associated interactive item upon detecting a specific movement of the hand, such a Pull gesture that comprises user 22 moving hand 30 away from display along Z-axis 36. The Pull gesture is described in U.S. patent application Ser. No. 13/423,314, filed on Mar. 19, 2012, whose disclosure is incorporated herein by reference.

In a second comparison step 48, if the size of the active item is greater than or equal to a predetermined threshold size, then computer 26 proceeds to a selection step 50, wherein the computer selects the active item. The computer may then activate a function associated with the active item. The method then ends. Returning to step 48, if the active item's size is less than the threshold size, then the method reverts to step 44.

In some embodiments, activating the function comprises presenting an image over a full area of display 28. In additional embodiments, activating the function comprises executing a software application associated with the active item. In further embodiments the active item is associated with a media item (e.g., a music track or a movie), and activating the function comprises playing a media file associated with the active item.

In alternative embodiments, computer 26 may present a virtual input device on display 28, and the item selection method described in the flow diagram of FIG. 2 can be used to control the virtual input device. Examples of virtual input devices include but are not limited to virtual keyboards, virtual numeric keypads and virtual game controls.

Figure 3:
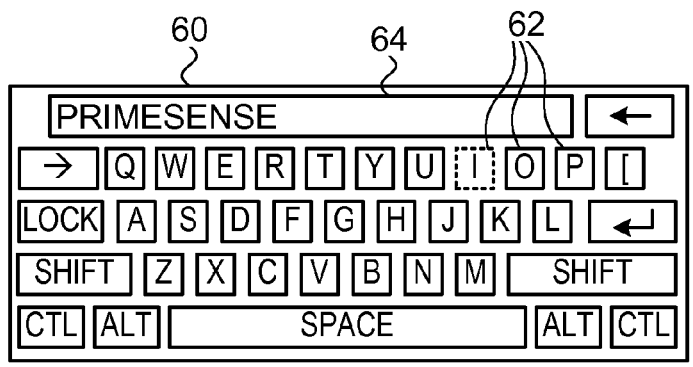
FIG. 3 is a schematic pictorial illustration of a virtual keyboard presented on a display, in accordance with an embodiment of the present invention.

FIG. 3 is a schematic pictorial illustration of a virtual keyboard 60 presented on display 28, in accordance with an embodiment of the present invention. Keyboard 60 comprises multiple virtual keys 62 and a text box 64. As user 22 moves hand 30 towards a given key 62, computer 26 highlights the given key (e.g., the "T" key shown in FIG. 3). If user 22 wants to select the given key, the user can perform a Grab gesture, followed by a Pull gesture. As user 22 pulls back hand 30, computer 26 responsively enlarges the given virtual key. Upon the presented size of the given virtual key meeting a specific threshold, computer 26 accepts the given virtual key as input and presents the character associated with the virtual key in text box 64. Prior to performing the Grab and the Pull gestures (i.e., while the hand is extended toward display 28), user 22 can highlight a different virtual key 62 by moving his/her hand transversely. In response to the transverse motion, computer 26 can highlight the virtual key to which the user is pointing.

As described supra, computer 26 can be configured to capture sequences of images indicating movements of hand 30, where the hand can be moving toward display 28, away from the display, or in a transverse motion relative to the display. For example, while interacting with virtual keyboard 60, computer 26 highlights a given virtual key 62 in response to detecting a transverse motion of hand 30, and selects a given virtual key in response to a Pull gesture. However, there are instances when user 22 inadvertently moves hand 30 in a transverse motion while performing a Pull gesture.

To accommodate the inadvertent transverse motion, computer can be configured to assign less significance to any hand motion detected along X-axis 32 and/or Y-axis 34 while user 22 is performing a Pull gesture. Limiting the significance of any transverse motion as computer 26 enlarges (i.e., "zooms in" on) the active interactive item as the user performs a Pull gesture can create a "funnel" like sensation towards a given interactive item 38 that the user intends to select.

The significance of the transverse motion can be inversely related to a location of hand 30 while performing a Pull gesture. In other words, computer 26 can assign less significance to any detected transverse motion of hand 30 as the distance between the hand and display 28 increases. In operation, if computer 26 "suspects" that user 22 has identified a given interactive item and detects the user starting to perform a Pull gesture, the computer can start to limit the significance of any detected transverse motion of hand 30. As the Pull gesture progresses (and computer 26 further zooms in on the given interactive item) the computer can responsively decrease the significance of any detected transverse motion.

In some embodiments, the "funnel" paradigm can be extended to inhibit the association of hand 30 with a different interactive item 38 (or virtual key 62) when the associated interactive item has been enlarged beyond a predetermined threshold size, responsively to user 22 moving hand 30 away from display 28. In other words, upon computer 26 presenting the associated item at a size equal or greater to the predetermined size, the computer can substantially ignore any transverse movement of hand 30 along X-axis 32 and/or Y-axis 34.

As described supra, computer 26 can present interactive items 38 in an organized layout. For example, computer 26 can organize interactive items 38 as a grid on display 28. In some embodiments, computer 26 can organize interactive items 38 as a one-dimensional grid comprising either a single horizontal row of the interactive items or a single vertical column of the interactive items. In alternative embodiments, computer 26 can organize interactive items 38 as a two-dimensional grid on display 28.

Figure 4A:
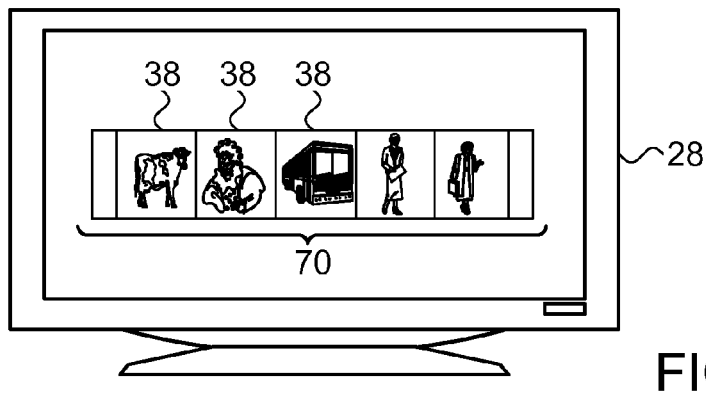
FIG. 4A is a schematic pictorial illustration of multiple interactive items presented in a one-dimensional horizontal grid, in accordance with an embodiment of the present invention.
Figure 4B:
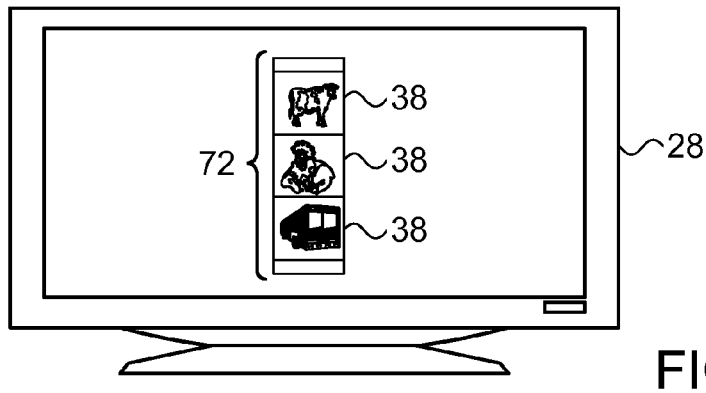
FIG. 4B is a schematic pictorial illustration of the multiple interactive items presented in a one-dimensional vertical grid, in accordance with an embodiment of the present invention.
Figure 4C:
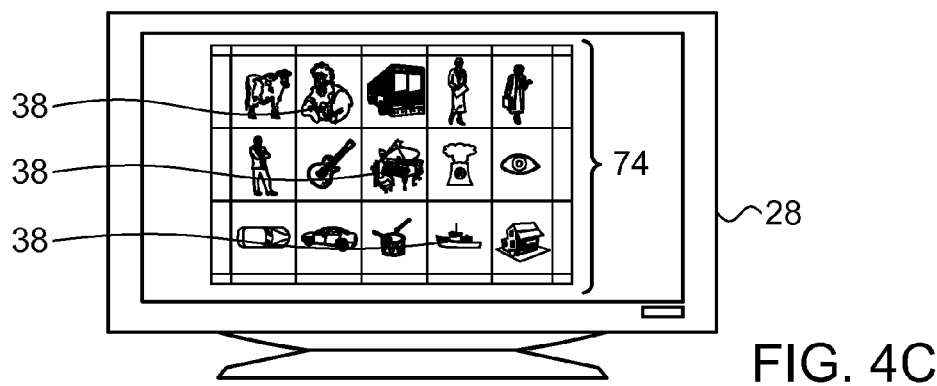
FIG. 4C is a schematic pictorial illustration of the multiple interactive items presented in a two-dimensional horizontal grid, in accordance with an embodiment of the present invention.

FIG. 4A is a schematic pictorial illustration of computer presenting interactive items 38 in a one-dimensional horizontal grid 70, in accordance with an embodiment of the present invention, FIG. 4B is a schematic pictorial illustration of computer 26 presenting interactive items 38 in a one-dimensional vertical grid 72, in accordance with an embodiment of the present invention, and FIG. 4C is a schematic pictorial illustration of computer 26 presenting interactive items 38 in a two-dimensional grid 74, in accordance with an embodiment of the present invention. In some embodiments, grids 70, 72 and 74 may comprise additional interactive items that (e.g., for space reasons) are not presented on display 28. In other words computer 26 can present a "window" into the one or the two-dimensional grids that can be scrolled using embodiments described hereinbelow. Grids 70, 72 and 74 are also referred to herein as ZoomGrids or ZoomGrid surfaces.

Figure 5:
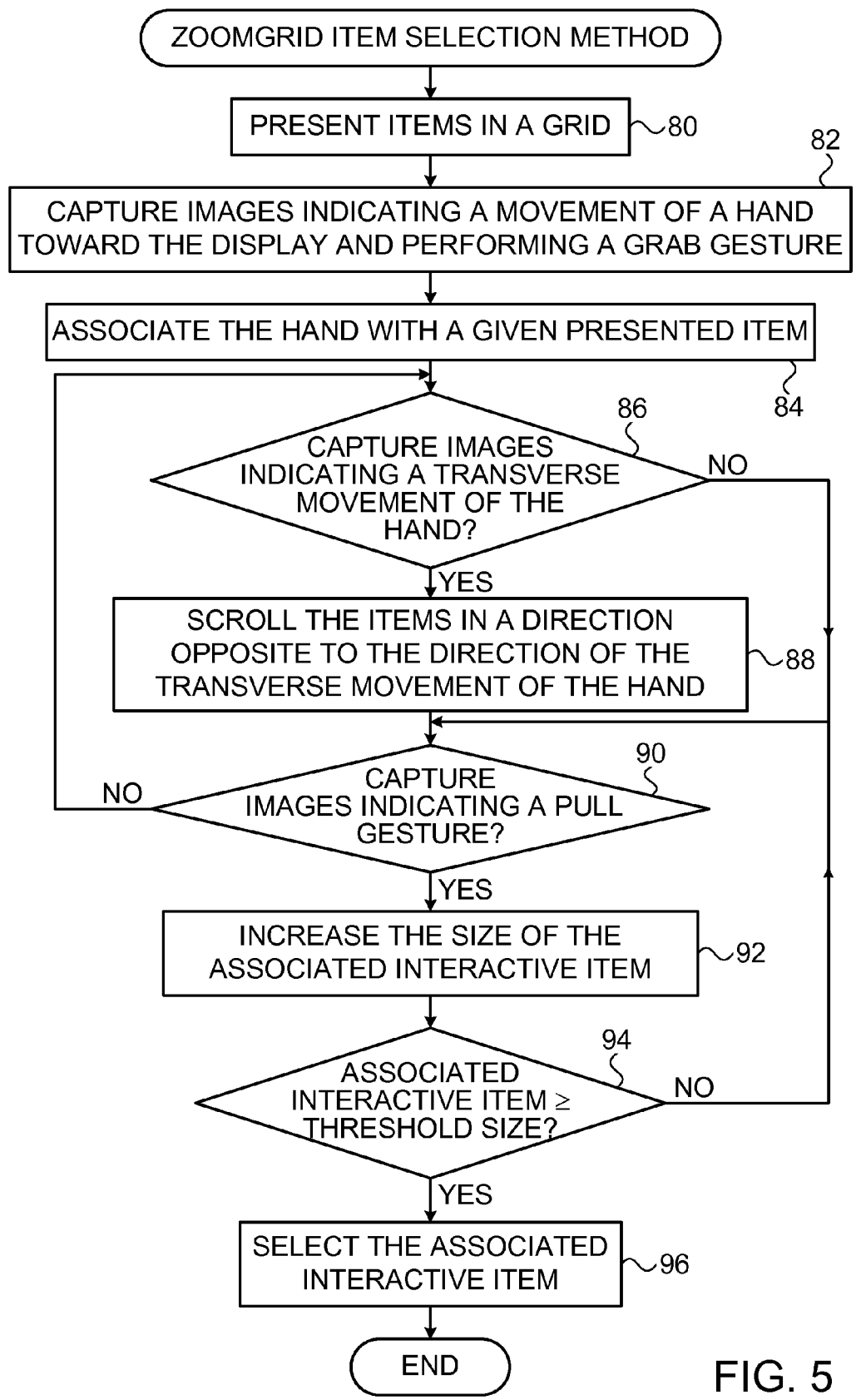
FIG. 5 is a flow diagram that schematically illustrates a method of selecting a given on-screen interactive item from the two-dimensional grid, in accordance with an embodiment of the present invention.

FIG. 5 is a flow diagram that schematically illustrates a method of selecting a given on-screen interactive item 38 from grid 74, and FIGS. 6A-6D are schematic pictorial illustrations of user 22 interacting with grid 74, in accordance with an embodiment of the present invention. In the description of FIGS. 6A-6D herein, some of interactive items 38 may be differentiated by appending a letter to the identifying numeral, so that grid 74 comprises interactive items 38A-38I.

In a presentation step 80, computer 26 presents multiple interactive items 38 in grid 74 on display 28, and in a first capture step 82, computer 26 captures a first sequence of images indicating a motion of hand 30 toward display 28, followed by a Grab gesture. In a first association step 84, computer 26 associates a given interactive item 38 with hand 30. In the example shown in FIGS. 6A-6D, computer 26 associates interactive item 38H with hand 30. Alternatively, computer 26 can associate hand 30 with the interactive item presented at a center of grid 74 (e.g., interactive item 38E).

In a first comparison step 86, if computer 26 captures a second sequence of images indicating a transverse motion of hand (i.e., a horizontal motion along X-axis 32 and/or a vertical motion of the hand along Y-axis 34) in a first direction relative to display 28, then in a scrolling step 88, computer 26 scrolls grid 74 in a second direction, which is different from the first direction of the hand. For example, if user 22 moves hand 30 from left to right, then computer 26 scrolls grid 74 in an opposite direction from right to left. Likewise, if user 22 moves hand 30 in an upward vertical motion, then computer 26 scrolls grid 74 downward.

In some embodiments, as user 22 moves hand 30 towards a given interactive item 38 presented off-center on display 28, computer 26 can reposition the off-center interactive item to the center of the display 28, and associate hand 30 with the centered interactive item. Thus, in contrast to existing touch screen paradigms that are well known in the art, the interactive items on display 28 pan in a direction that is generally opposite to the direction of transverse movement of the user's hand. (For example, reaching toward a given interactive item 38 at the right of the screen causes the interactive items on screen to shift left.) This sort of scan control is easily learned and internalized by users after only a short orientation period, and can facilitate rapid, intuitive interaction with the display.

In a second comparison step 90, if computer 26 captures a third sequence of images indicating that user 22 is performing a Pull gesture by moving hand 30 away from display 28 (i.e., along Z-axis 36), then in a zooming step 92, the computer enlarges both the associated interactive item and the interactive items surrounding the associated interactive item, as space allows. Alternatively, computer 26 can enlarge only the associated interactive item.

Figure 6A:
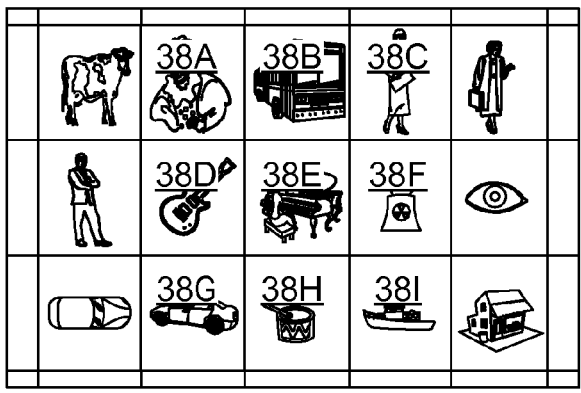
FIGS. 6A-6D are schematic pictorial illustrations of different zoom levels of the two-dimensional grid, in accordance with an embodiment of the present invention.
Figure 6B:
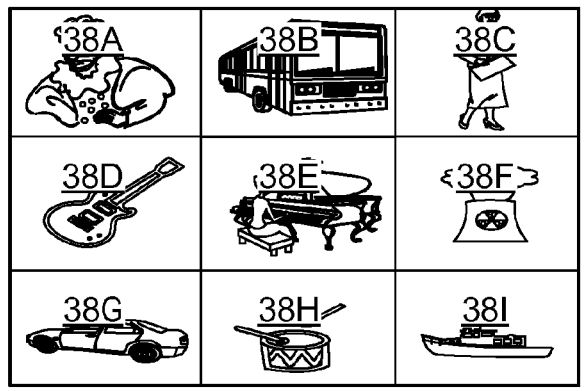
Figure 6C:
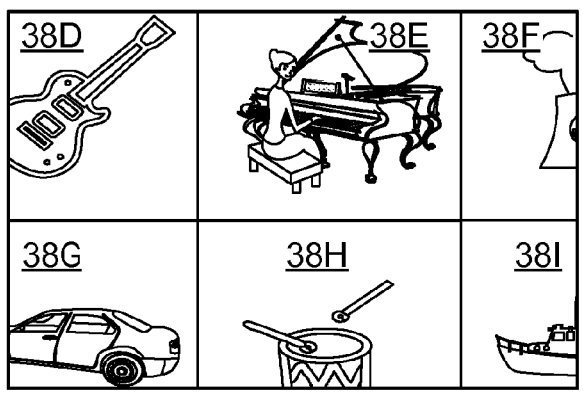

FIG. 6A shows display 28 presenting all of the interactive items (including items 38A-38I) in grid 74. FIGS. 6B and 6C shows display 28 presenting a subset of the interactive items as user 22 pulls hand 30 away from display 28, and computer 26 zooms in on respective subsets of grid 74. In FIG. 6B, computer 26 zooms in and fills display 28 with items 38A-38I as user 22 starts performing a Pull Gesture. FIG. 38C shows interactive items 38E and 38H filling most of display 28 as user 22 continues the Pull gesture and moves hand 30 further from the display.

Figure 6D:
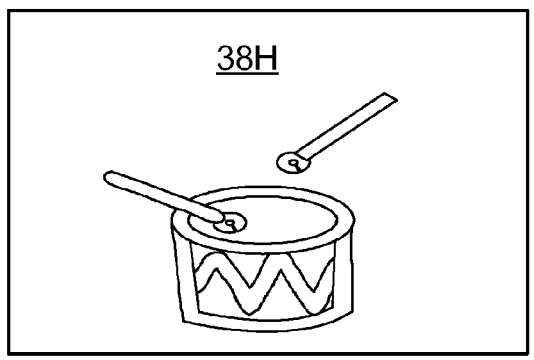

In a third comparison step 94, if computer 26 is presenting the associated interactive item at a size greater than or equal to a specific threshold, then in a selection step 96, the computer selects the associated item, and the method ends. As described supra, selecting the associated interactive item may comprise presenting an image over a full area of display 28. FIG. 6D shows interactive item 38I presented as a full-screen image on display 28.

Returning to step 94, if computer 26 is presenting the associated interactive item at a size less than the specific threshold, then the method continues with step 90. Returning to step 90, if the third sequence of images do not indicate a Pull gesture, then the method continues with step 86. Finally, returning to step 86, if the second sequence of images do not indicate a transverse motion of hand 30, then the method continues with step 96.

While playing a media file, computer 26 can present media controls that user 22 can engage using embodiments described herein. Media player controls may consist of controls for actions such as play/pause, seek, mute, volume up/down, next/prev track, fast-forward, rewind and so on. In embodiments of the present invention, while a media is playing (either in the foreground or in the background), the player controls can be placed on an invisible ZoomGrid surface. During the playback, when the user performs a Pull gesture, the ZoomGrid surface containing the imaginary controls gradually becomes visible. The controls can then be selected in the same way as any other interactive items 38 presented on a ZoomGrid surface.

A special behavior of the ZoomGrid based player controls mechanism is that upon selecting a given control, the controls surface can retract back and "disappear" (i.e., as if a spring connects it to the surface on which the media is playing). Toggle controls like mute/unmute or pause/play or buttons can be easily implemented again by the same embodiments as those used to select the interactive items (i.e., the item selection triggers a given operation). Continuous controls such as volume or seek can be implementing by transverse movements after selection of the control, and a Release gesture can be used to disengage from the control.

Figure 7:
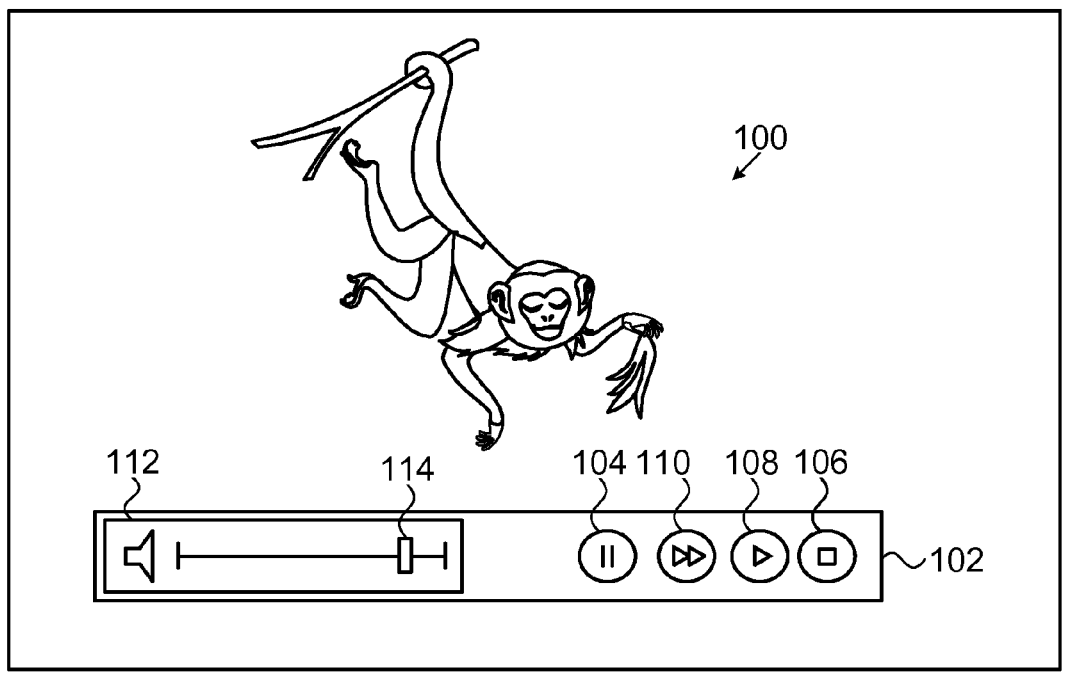
FIG. 7 is a schematic pictorial illustration of a first example of a ZoomGrid based media player control, in accordance with an embodiment of the present invention.

FIG. 7 is a schematic pictorial illustration of a first example of a ZoomGrid based media player control, in accordance with an embodiment of the present invention. While playing a movie 100, computer 26 presents a one-dimensional ZoomGrid 102 in response to the user moving hand 30 toward display 28. ZoomGrid 102 comprises a pause control 104, a stop control 106, play control 108, and a seek control 110. In the example shown in FIG. 7, user 22 has selected a volume control 112 using embodiments described herein, and can manipulate a volume slider icon 114 via transverse hand motions along X-axis 32.

Figure 8:
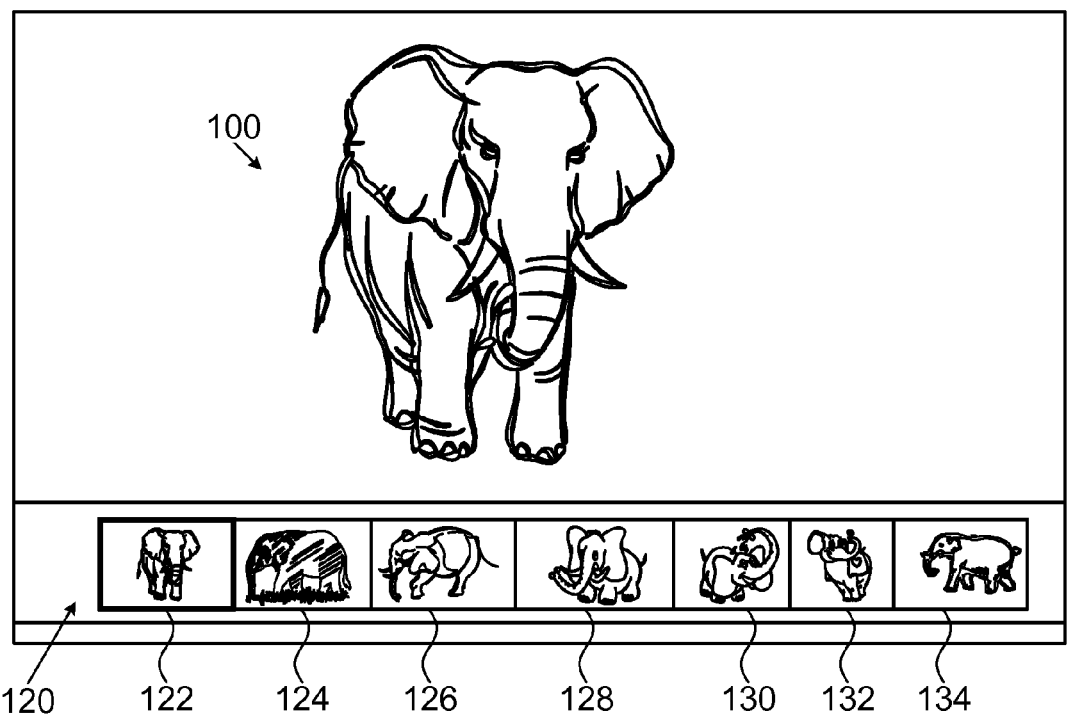
FIG. 8 is a schematic pictorial illustration of a second example of a ZoomGrid based media player control, in accordance with an embodiment of the present invention.

FIG. 8 is a schematic pictorial illustration of a second example of a ZoomGrid based media player control, in accordance with an embodiment of the present invention. In response to user 22 selecting seek control 110 using embodiments described herein, computer 26 presents a one-dimensional ZoomGrid 120 that comprises scrub points 122, 124, 126, 128, 130, 132 and 134. The scrub points comprise specific scenes in movie 100 that user 22 can directly skip to by selecting one of the scrub points using the embodiments described herein. In the example shown in FIG. 8, user 22 has selected scrub point 122, and the computer responsively presents a given scene in movie 100 that corresponds to the selected scrub point.

In some embodiments, the ZoomGrid mechanisms described herein can be used to control television channel selection (i.e., "surfing" and/or "zapping" channels). In a ZoomGrid channel surfing system all of the channels can be organized on a two-dimensional ZoomGrid surface. If the user is viewing a certain channel and wants to look for an alternative channel, the user starts pulling at the ZoomGrid surface (e.g., by perform a Grab gesture followed by a Pull gesture), computer 26 "pushes back" (i.e., zooms out) the ZoomGrid, thereby revealing additional channels that surround the channel currently being viewed. As the user pulls or pushes the ZoomGrid (zooming out), computer 26 can reveal additional channels. When the user identifies an interesting channel, the user can start pulling back on the ZoomGrid surface in order to select the channel using embodiments described herein.

An extension to this embodiment is to organize the channels on ZoomGrid according to their popularity. For example, computer 26 can present the most popular channel at a center of display 28, and surround the most popular channel with "rings" of channels, where the more popular channels are presented in rings closer to the center. In some embodiments, computer 26 can measure popularity based on a specific user's viewing habits. Alternatively, computer 26 can measure channel popularity based on viewing habits of all users of the computer.

In further embodiments, the ZoomGrid mechanisms described herein can be used by computer 26 to simulate an interaction between the user and a handheld remote control device. Although most handheld touchscreen-based remote control devices require actual contact between the user's fingers and the device, some new types of remote control devices are capable of sensing the locations of the user's fingers in space, in proximity to the device. For example, the type of optical depth sensor that is described in the above-referenced U.S. Patent Application Publication 2010/0007717 may be implemented on a small scale in a handheld device (not shown) in order to reconstruct 3D maps of hand 30 in proximity to the device, and detect motion of the hand and fingers in three dimensions. As another example, the TeleTouch™ device, produced by ZRRO Ltd. (Tel Aviv, Israel) comprises a "3D Multi-Touch" device, which detects movement of the hand and fingers in both touching and "hovering" positions.

The principles of the zooming interface that are described supra may be implemented, mutatis mutandis, in the in the handheld 3D remote control devices depicted herein. In other words, rather than moving hand 30 in space in front of the display 28, the user moves the hand (or fingers) in the same way relative to the remote control device. The device can sense transverse (along X-axis 32 and/or Y-axis 34) and lateral (along Z-axis 36) motion, as well as Grab and Release gestures, and convey control signals accordingly to the computer.

In operation, computer 26 presents multiple interactive items on display 28, and receives, from the handheld remote control device, a first signal indicating a position in space of hand 30 in proximity to the handheld remote control device. Responsively to the position, computer 26 associates a given interactive item 38 with hand 30. After associating the item, computer 26 receives, from the handheld remote control device, a second signal indicating a movement of the hand relative to the handheld remote control device, and responsively to the movement, changes a size of (e.g., enlarges) the one of the interactive items on the display.

This sort of use of a remote control device permits the same sort of versatile, intuitive control that is offered by the full-scale ZoomGrid described above, while relieving the user of a need to sit up (or stand) and make large arm motions in order to interact with the display.

Multi-Level Zoomgrid

In some embodiments, the ZoomGrid mechanisms described supra can be extended to a multi-level ZoomGrid control scheme that allows user 22 to "pull" a ZoomGrid surface loaded with interactive items 38. In addition to the embodiments described supra (i.e., media items software applications and virtual input devices), the interactive items in a given ZoomGrid surface may comprise folders (i.e., directories) of sub-items 38. As explained hereinbelow, while presenting a given folder on a ZoomGrid surface, the computer may not present the sub-items associated with the given folder unless the given folder is presented at a predetermined size. In other words, in response to gestures described herein, when zooming in to a given folder 38, computer 26 can present interactive items 38 that are associated with the folder, and enable the user to continue zooming in to select a given interactive item 38.

The multi-level ZoomGrid mechanism described herein enables the user to dig inside multi-level folder data structures, and to select a given interactive item 38 all in one single continuous three dimensional movement, typically a Pull gesture. Alternatively the user can use the Grab and Release gestures in order to intermittently grab and release control of each of the folders along a hierarchical path to the given interactive item, and then select the given interactive item.

Figure 9:
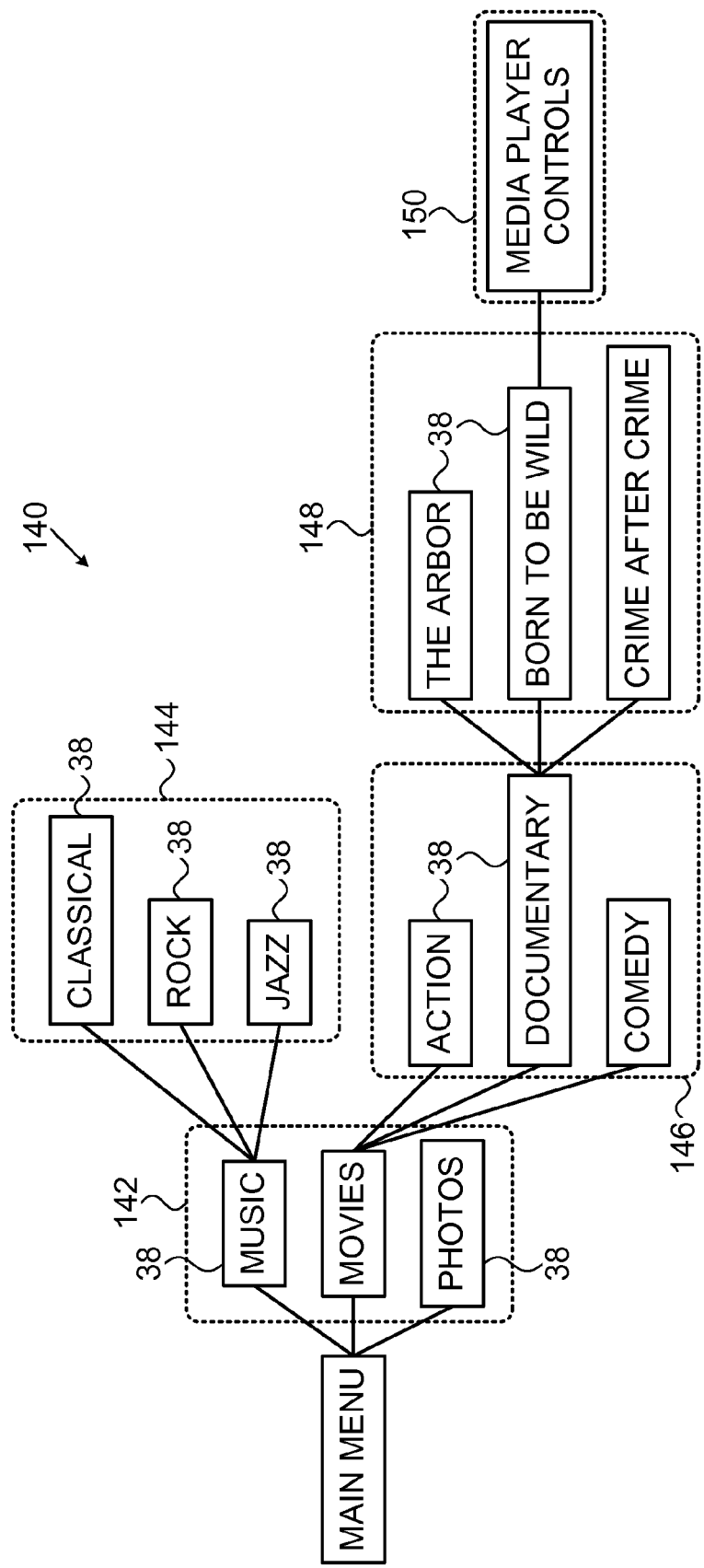
FIG. 9 is an schematic illustration of a tree data structure that the computer can present as a series of hierarchical ZoomGrid surfaces, in accordance with an embodiment of the present invention.

FIG. 9 is an schematic illustration of a tree data structure 140 that computer 26 can present as a series of hierarchical ZoomGrid surfaces 142, 144, 146, 148 and 150, in accordance with an embodiment of the present invention. Each of the ZoomGrid surface comprises one or more interactive items 38. In operation, as user 22 traverses tree 140 and accesses a given interactive item 38, computer 26 presents a ZoomGrid surface comprising sub-items 38 (i.e., children nodes in tree 140) of the given interactive item. In the example shown in FIG. 9, the sub-items can comprise menus, media items or media player controls.

Figure 10A:
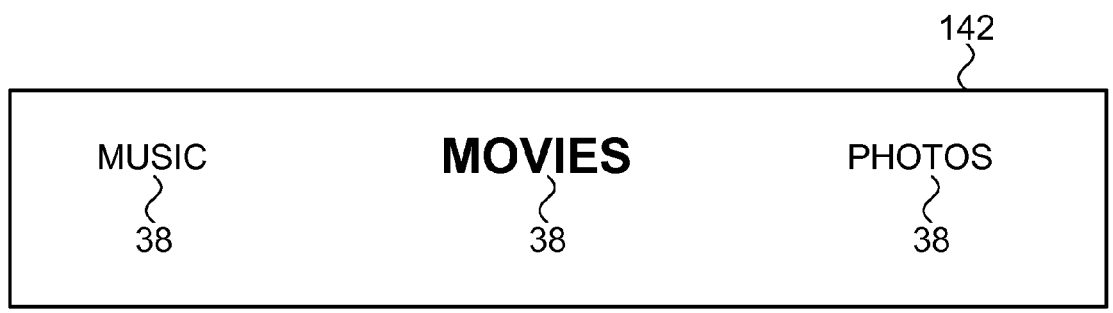
FIGS. 10A-10D are schematic pictorial illustrations showing the hierarchical ZoomGrid surfaces based on the tree data structure, in accordance with an embodiment of the present invention.
Figure 10B:
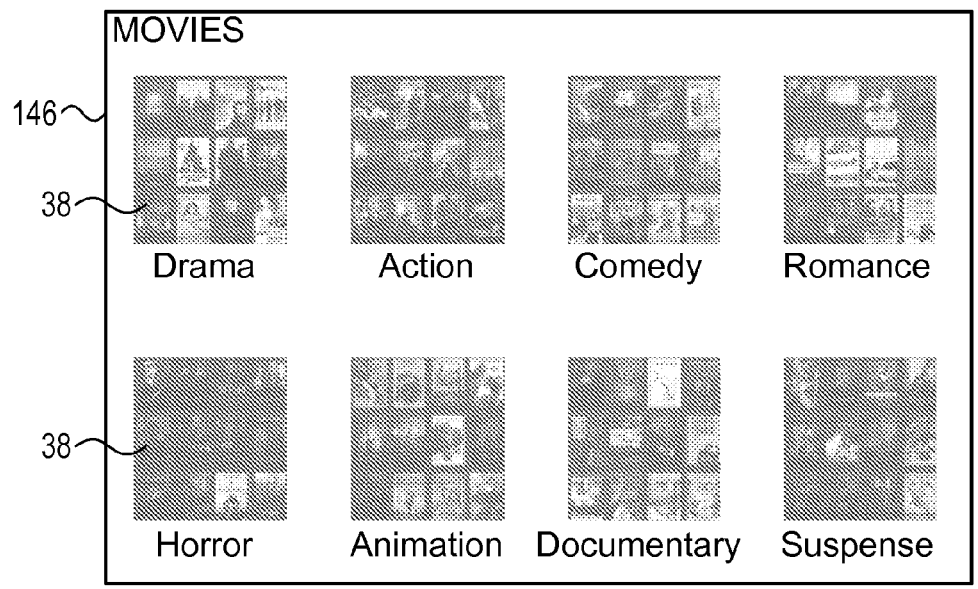
Figure 10C:
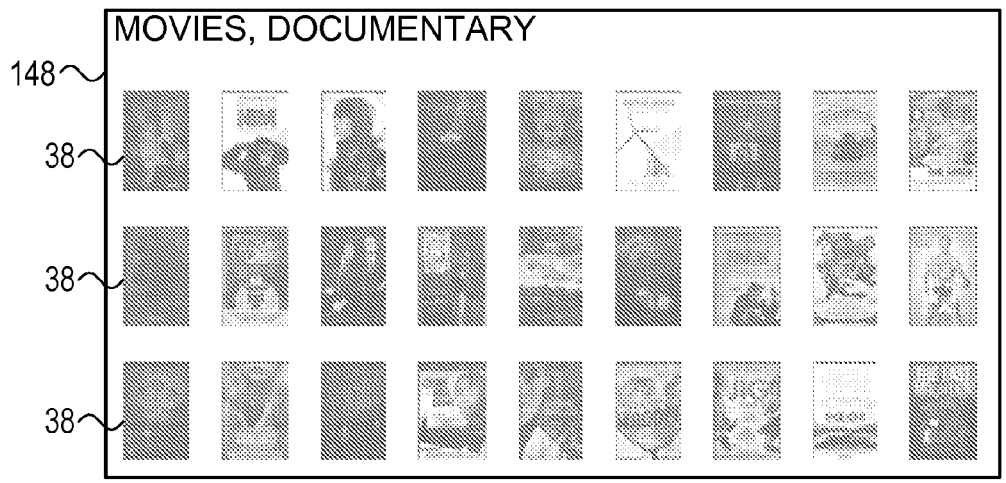
Figure 10D:
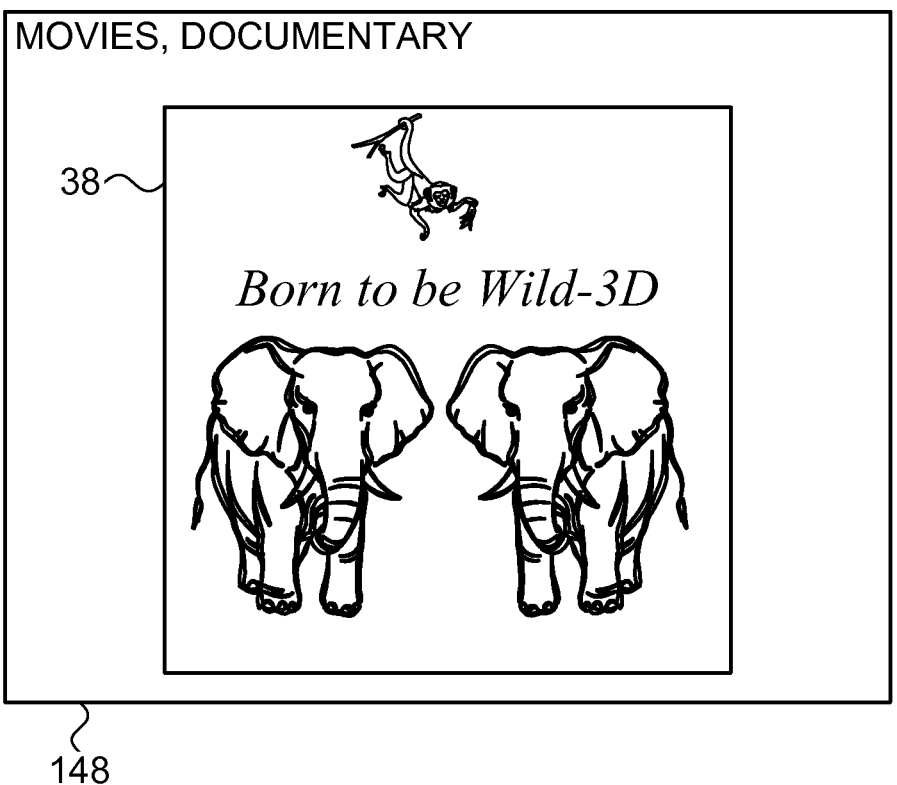

FIGS. 10A-10D are schematic pictorial illustrations showing a multi-level ZoomGrid control scheme based on tree 140, in accordance with an embodiment of the present invention. Using embodiments described herein, a user gradually zooms in from viewing a menu of media types (ZoomGrid Surface 142 in FIG. 10A), to types categories of movies (ZoomGrid Surface 146 in FIG. 10B), to viewing the movies in a particular category (ZoomGrid Surface 148 in FIG. 10C), and then zooming in to select a given interactive item 38 (e.g., movie 100) for viewing (FIG. 10D). When the user zooms in on the interactive item representing the chosen movie so that it grows beyond a certain threshold size, the movie starts to play automatically, without the user having to explicitly select the movie or activate a "play" control. As shown in FIGS. 7 and 8, once the movie is playing, user 22 can control various playback controls using the ZoomGrid media control embodiments described supra.

While interacting with a multi-level ZoomGrid, computer 26 can define certain zoom levels as "comfort zones," because they present content in a desirable way (for example, with an integer number of rows and columns of icons, with no icons cut off at the edges of the display). If user 22 transversely moves hand (i.e., along X-axis 32 and/or Y-axis 34) while display 28 is in a comfort zone, the zoom may be locked, so that only significant motions along Z-axis 36 motions changes the zoom level. In other situations, the zoom levels can be biased in order to drive the display into a comfort zone in response to relatively small movement of hand 30 along Z-axis 36. For example, if a given interactive item 38 comprises a folder of sub-items 38, then computer 26 will enlarge folder 36 (and thereby display the sub-items) upon detecting significant motion of hand 30 away from display 28.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A user interface method, comprising:
presenting by a computer executing a user interface, multiple interactive items on a display;
capturing a first sequence of images indicating a position in space of a hand of a user in proximity to the display;
responsively to the position, associating a given interactive item with the hand,
wherein associating the given interactive item comprises detecting, in the first sequence of images, a predetermined gesture of the hand, wherein the predetermined gesture comprises closing at least some of the fingers of the hand, and initiating association of the given interactive item with the hand responsively to the gesture;

after associating the item, capturing a second sequence of images indicating a movement of the hand;

responsively to the movement, changing a size of the one of the items on the display; and releasing the association of the given interactive item from the hand upon detecting that the fingers have opened.

2. The method according to claim 1, wherein the given interactive item is enlarged in response to the movement of the hand comprising motion away from the display.

3. The method according to claim 1, wherein the given interactive item is associated with a function of the computer, and wherein the method comprises activating the function when the given interactive item has been enlarged, in response to the movement, to at least a predetermined threshold size.

4. The method according to claim 3, wherein activating the function comprises playing a media item associated with the given interactive item.

5. The method according to claim 3, wherein activating the function comprises executing a software application.

6. The method according to claim 3, wherein activating the function comprises displaying an image over a full area of the display.

7. The method according to claim 1, wherein associating the given interactive item comprises choosing the interactive item that is presented at a center of the display.

8. A user interface method, comprising:

presenting by a computer executing a user interface, multiple interactive items on a display;

capturing a first sequence of images indicating a position in space of a hand of a user in proximity to the display;

responsively to the position, associating a given interactive item with the hand, wherein associating the given interactive item comprises detecting, in the first sequence of images, a predetermined gesture of the hand, and initiating association of the given interactive item with the hand responsively to the gesture;

after associating the item, capturing a second sequence of images indicating a movement of the hand; and responsively to the movement, changing a size of the one of the items on the display, wherein associating the given interactive item comprises detecting, in the first sequence of images, a transverse motion of the hand while the hand maintains the gesture, and associating a different one of the interactive items with the hand responsively to the transverse motion.

9. The method according to claim 8, wherein the predetermined gesture comprises closing at least some of the fingers of the hand.

10. The method according to claim 8, wherein the movement of the hand comprises motion away from the display, and wherein associating the different one of the interactive items with the hand is inhibited when the given interactive item has been enlarged, responsively to the motion, beyond a predetermined threshold size.

11. The method according to claim 10, and comprising assigning less significance to motion along a plane comprising vertical and horizontal axes, upon detecting the motion away from the display.

12. The method according to claim 1, wherein at least some of the interactive items contain sub-items, which are not displayed as long as the interactive items presented on the display are smaller than a predetermined size, and wherein enlarging the given interactive item comprises displaying the sub-items contained by the given interactive item when the given interactive item is enlarged to at least the predetermined size.

13. The method according to claim 12, wherein the given interactive item is enlarged in response the movement comprising significant motion away from the display.

14. The method according to claim 1, wherein sensing the position comprises generating a three-dimensional (3D) map of at least a part of body of the user, including the hand.

15. The method according to claim 1, wherein associating the item with the hand comprises identifying the item based on a gaze of the user.

16. The method according to claim 1, wherein associating the item with the hand comprises identifying the item based on a pointing gesture performed the user.

17. The method according to claim 1, wherein presenting the multiple interactive items comprises organizing the multiple interactive items as a grid on the display.

18. The method according to claim 1, wherein changing the size of the one of the items comprises enlarging the one of the items on the display.

19. An apparatus, comprising:

a sensing device; and a computer executing a user interface and configured to present multiple interactive items on a display coupled to the computer, to capture a first sequence of images indicating a position in space of a hand of a user in proximity to the display, to associate, responsively to the position, a given one of the interactive items with the hand, to capture, after associating the given interactive item, a second sequence of images indicating a movement of the hand and to change a size of, responsively to the movement, the given interactive item on the display, wherein the computer is configured to associate the given interactive item by detecting, in the first sequence of images, a predetermined gesture of the hand, and initiating association of the given interactive item with the hand responsively to the gesture, and to detect, in the first sequence of images, a transverse motion of the hand while the hand maintains the gesture, and to associate a different one of the interactive items with the hand responsively to the transverse motion.

20. The apparatus according to claim 19, wherein the computer is configure to enlarge the given interactive item in response to the movement of the hand comprising motion away from the display.

21. The apparatus according to claim 19, wherein the computer is configured to associated the given interactive item with a function of the computer, and wherein the method comprises activating the function when the given interactive item has been enlarged, in response to the movement, to at least a predetermined threshold size.

22. The apparatus according to claim 21, wherein the computer is configured to activate the function by playing a media item associated with the given interactive item.

23. The apparatus according to claim 21, wherein the computer is configured to activate the function by executing a software application.

24. The apparatus according to claim 21, wherein the computer is configured to activate the function by displaying an image over a full area of the display.

25. The apparatus according to claim 19, wherein the computer is configured to associate the given interactive item by choosing the interactive item that is presented at a center of the display.

26. The apparatus according to claim 19, wherein the predetermined gesture comprises closing at least some of the fingers of the hand.

27. An apparatus, comprising:
a sensing device; and
a computer executing a user interface and configured to present multiple interactive items on a display coupled to the computer, to capture a first sequence of images indicating a position in space of a hand of a user in proximity to the display, to associate, responsively to the position, a given one of the interactive items with the hand, to capture, after associating the given interactive item, a second sequence of images indicating a movement of the hand and to change a size of, responsively to the movement, the given interactive item on the display,
wherein the computer is configured to associate the given interactive item by detecting, in the first sequence of images, a predetermined gesture of the hand comprising closing at least some of the fingers of the hand, and initiating association of the given interactive item with the hand responsively to the gesture, and
to release the association of the given interactive item from the hand upon detecting that the fingers have opened.

28. The apparatus according to claim 19, wherein the movement of the hand comprises motion away from the display, and wherein the computer is configured to inhibit associating the different one of the interactive items with the hand when the given interactive item has been enlarged, responsively to the motion, beyond a predetermined threshold size.

29. The apparatus according to claim 28, wherein the computer is configured to assign less significance to motion along a plane comprising vertical and horizontal axes, upon detecting the motion away from the display.

30. The apparatus according to claim 19, wherein at least some of the interactive items contain sub-items, which are not displayed as long as the interactive items presented on the display are smaller than a predetermined size, and wherein the computer is configured to enlarge the given interactive item by displaying the sub-items contained by the given interactive item when the given interactive item is enlarged to at least the predetermined size.

31. The apparatus according to claim 30, wherein the computer is configured to enlarge the given interactive item in response the movement comprising significant motion away from the display.

32. The apparatus according to claim 19, wherein the computer is configured to sense the position by generating a three-dimensional (3D) map of at least a part of body of the user, including the hand.

33. The apparatus according to claim 19, wherein the computer is configured to associate the item with the hand by identifying the item based on a gaze of the user.

34. The apparatus according to claim 19, wherein the computer is configured to associate the item with the hand by identifying the item based on a pointing gesture performed the user.

35. The apparatus according to claim 19, wherein the computer is configured to present the multiple interactive items by organizing the multiple interactive items as a grid on the display.

36. The apparatus according to claim 19, wherein the computer is configured to change the size of the one of the items by enlarging the one of the items on the display.

37. A computer software product comprising a non-transitory computer-readable medium, in which program instructions are stored, which instructions, when read by a computer executing a user interface, cause the computer to present multiple interactive items on a display, to capture a first sequence of images indicating a position in space of a hand of a user in proximity to the display, to associate, responsively to the position, a given one of the interactive items with the hand, to capture, after associating the given interactive item, a second sequence of images indicating a movement of the hand, and to change, responsively to the movement, a size of the given interactive item on the display,
wherein the instructions cause the computer to associate the given interactive item by detecting, in the first sequence of images, a predetermined gesture of the hand comprising closing at least some of the fingers of the hand, and initiating association of the given interactive item with the hand responsively to the gesture, and to release the association of the given interactive item from the hand upon detecting that the fingers have opened.

38. A computer software product comprising a non-transitory computer-readable medium, in which program instructions are stored, which instructions, when read by a computer executing a user interface, cause the computer to present multiple interactive items on a display, to capture a first sequence of images indicating a position in space of a hand of a user in proximity to the display, to associate, responsively to the position, a given one of the interactive items with the hand, to capture, after associating the given interactive item, a second sequence of images indicating a movement of the hand, and to change, responsively to the movement, a size of the given interactive item on the display,
wherein the instructions cause the computer to associate the given interactive item by detecting, in the first sequence of images, a predetermined gesture of the hand, and initiating association of the given interactive item with the hand responsively to the gesture, and to detect, in the first sequence of images, a transverse motion of the hand while the hand maintains the gesture, and to associate a different one of the interactive items with the hand responsively to the transverse motion.

* * * * *